(12) United States Patent
Kim

(10) Patent No.: US 6,934,753 B2
(45) Date of Patent: Aug. 23, 2005

(54) APPARATUS AND METHOD FOR BLOCKING ACCESS TO UNDESIRABLE WEB SITES ON THE INTERNET

(75) Inventor: Tae-Ju Kim, Seoul (KR)

(73) Assignee: Planty Net Co., Ltd., Seoul (KR)

( * ) Notice: Subject to any disclaimer, the term of this patent is extended or adjusted under 35 U.S.C. 154(b) by 733 days.

(21) Appl. No.: 09/802,357

(22) Filed: Mar. 8, 2001

(65) Prior Publication Data

US 2001/0037385 A1 Nov. 1, 2001

(30) Foreign Application Priority Data

Apr. 21, 2000 (KR) .................................. 10-2000-0021151

(51) Int. Cl.[7] .............................................. G06F 12/14
(52) U.S. Cl. ...................... 709/225; 709/219; 709/218; 707/202; 707/104.1
(58) Field of Search .......................... 725/25; 710/200; 707/102, 104.1, 6, 7; 709/203, 217, 219, 218, 224, 225, 228, 229, 230

(56) References Cited

U.S. PATENT DOCUMENTS 6,065,055 A * 5/2000 Hughes et al. .............. 709/229

6,324,552 B1 * 11/2001 Chang et al. ............. 715/501.1

FOREIGN PATENT DOCUMENTS

WO      WO 01/55905 A1 *  8/2001

* cited by examiner

Primary Examiner—B. James Peikari
(74) Attorney, Agent, or Firm—Cislo & Thomas LLP

(57) ABSTRACT

An apparatus and method for blocking access to undesirable web sites by central control at a network provider's side according to the subscriber requests are disclosed, in which the apparatus reduces time and expenditure for managing the subscriber side and allows the subscriber to use the Internet without anxiety of access to undesirable web sites. The apparatus according to the present invention comprises a central control center for specifying and providing a control list of undesirable web sites to be blocked, a plurality of remote control units for blocking access to the undesirable web sites on the basis of the control list, and a link control network for controlling the connection of the plurality of remote control units and the central control center.

6 Claims, 4 Drawing Sheets

APPARATUS AND METHOD FOR BLOCKING ACCESS TO UNDESIRABLE WEB SITES ON THE INTERNET

FIELD OF THE INVENTION

The present invention relates to an apparatus and method for blocking access to undesirable web sites by restricting access to a specific Internet web site classified into an undesirable web site, thereby providing an appropriate Internet connection service to subscribers.

BACKGROUND OF THE INVENTION

Recently, Internet technology has been developed such that prior life style and paradigms of thoughts are changed large. Every country in the world competitively makes an effort to increase Internet use through the construction of super-high speed network, development of various multimedia content, magnification of communication markets, etc., to construct an intellectual information-based society.

Such an Internet has been used to exchange various and useful information among Internet users. However, since the Internet has open features in which Internet users are not restricted to access Internet sites, it has an opposite effect in the children can easily access undesirable web sites such as obscene web sites that can be indiscriminately constructed.

In conventional systems, such undesirable web sites are blocked by installing undesirable information blocking software at client PCs, or by installing an undesirable information blocking system on a LAN in case of schools, organizations such as corporations, and so on.

The former is usually performed in homes for restricting access to undesirable web sites associated with pornography, narcotics, etc. by parents. However, if parents' ability for handling the PCs is less than that of their children, they cannot substantially block access to the undesirable web sites in homes such that their children can access the undesirable web sites.

The latter is performed in a LAN formed in schools or organizations. However, the latter has a drawback in that it entails high maintenance costs and time because the servers must be managed by a full time manager.

SUMMARY OF THE INVENTION

The present invention is made to resolve the problems in the prior art, and an object of the present invention is to provide an apparatus for blocking undesirable web sites that access to undesirable web information in undesirable web sites is automatically blocked by central control of network service provider when a subscriber requests undesirable web site blocking service, and a method for blocking undesirable websites using such apparatus.

Another object of the invention is to provide an apparatus for undesirable web sites and method that time and expenditure for managing access at subscriber side can be saved such that subscribers can safely use the Internet.

The present invention accomplishes the object by providing an apparatus for blocking access undesirable web sites, which comprises a central control center for specifying and providing a control list of the undesirable web sites to be blocked and for managing subscribers; a plurality of remote control units disposed between an Internet Service Provider (ISP) and the subscribers for blocking access to the undesirable web sites based on the control list to be blocked supplied from the central control center when the subscribers attempt to access the undesirable web sites; and a link control network for controlling connections of the plurality of remote control units and the central control center.

The present invention also accomplishes the object by providing a method of blocking access to undesirable web sites using the above blocking apparatus for blocking access to the undesirable web sites, comprising a first step of, when an Internet user subscribes to a link block service, registering information regarding the user and providing the information to a remote control unit; a second step of, when the registered subscriber attempts to access to a certain web site through Internet, comparing the web site with the lists of the undesirable web site list constituted by a central control center and destination URLs, and determining whether the subscriber attempts to access to undesirable web sites; a third step of, when URL corresponding to the website accessed by the subscriber is contained in the lists of the undesirable web sites, determining that the subscriber attempts to access to the undesirable web sites, and transmitting a message indicative of dis-allowance site to the subscriber terminal; a fourth step of, when the URL corresponding to the web site accessed by the subscriber is not contained in the lists of the undesirable web sites, providing a message of allowance to an Internet Service Provider to which the subscriber is registered, and establishing a link between the Internet Service Provider and the subscriber terminal, wherein the second to fourth steps are repeatedly performed whenever the subscriber attempts to access to a web site on the Internet.

BRIEF DESCRIPTION OF THE DRAWINGS

The preferred embodiments of the present invention will be described in conjunction with the accompanying drawings, wherein.

DETAILED DESCRIPTION OF THE PREFERRED EMBODIMENTS

Figure 1:
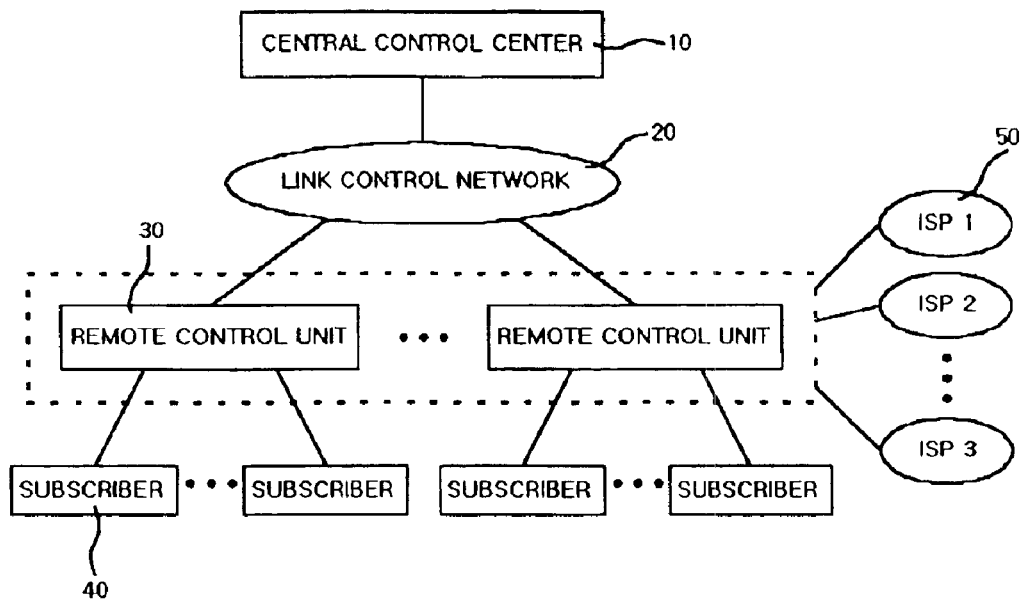
FIG. 1 is a schematic diagram of an apparatus for providing an undesirable web site blocking service for blocking access to undesirable web information sites according to the present invention.

FIG. 1 shows a schematic diagram of an apparatus for providing an undesirable web site blocking service for blocking access to undesirable web sites on the Internet. The apparatus includes a central control center 10 for constructing and providing a control list for undesirable web sites to be blocked and thereby for managing subscribers 40, a plurality of remote control units 30, disposed between an ISP 50 and the subscribers 40, for blocking an attempt to access an undesirable web site based on the control list for undesirable web sites to be blocked, supplied from the central control center 10, a link control network 20 for controlling connection of the central control center 10 and the remote control units 30, and the subscribers 40 having subscribed to the undesirable web site blocking service for blocking access to undesirable web sites capable of accessing the Internet through the remote control units 30. Here, reference numeral 50 indicates the Internet Service Providers (ISP) who provide Internet link services with the subscribers.

Figure 2:
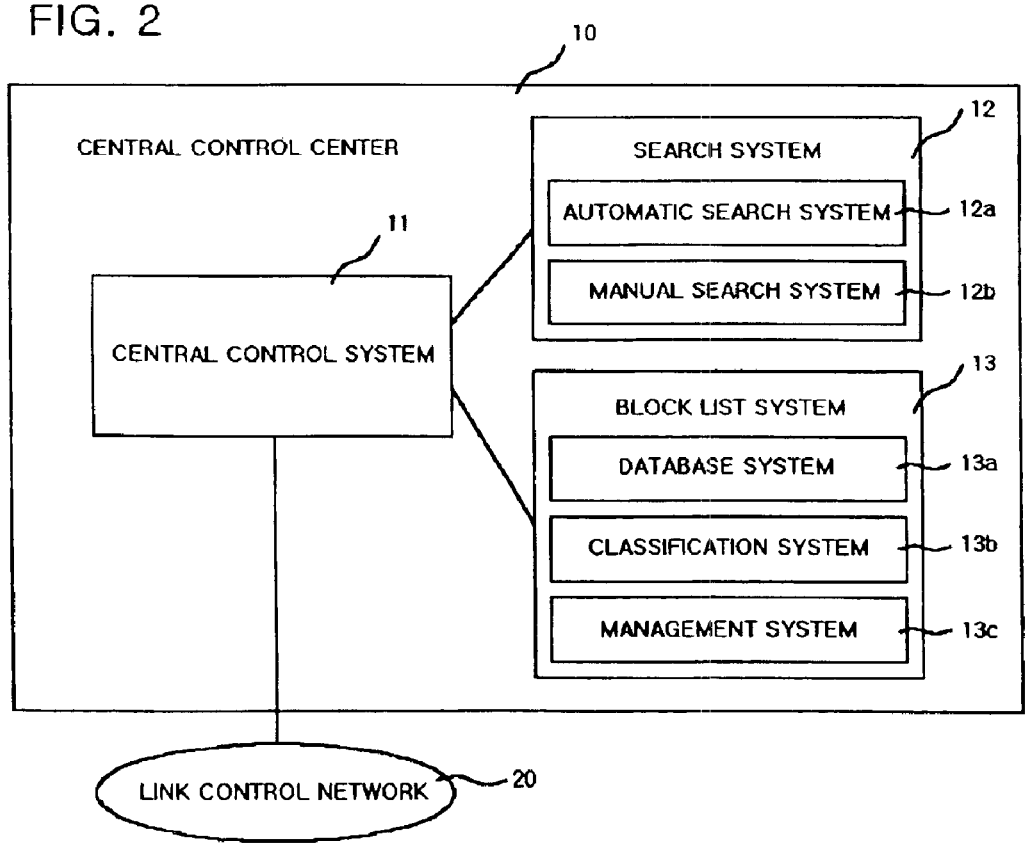
FIG. 2 is a block diagram of a central control center in the apparatus shown in FIG. 1.

FIG. 2 is a block diagram of the central control center 10 in the apparatus shown in FIG. 1. The central control center 10 includes a central control system 11 for searching and recording undesirable web sites to be blocked in real time and for supplying the recorded list of the undesirable web sites to the remote control units 30 through a link control network 20, a search system 12 for searching out undesirable web sites in web sites providing vast information through the Internet and a block list system 13 for classifying, recording, maintaining, managing or changing the web site list of undesirable web information on the Internet constructed by the search system 12. The search system 12 includes an automatic search system 12a and a manual search system 12b. The automatic search system 12a includes a web-robot for extracting information of documents supplied on the Internet and an expert engine for checking contents of information extracted by the web-robot and extracting list information of the web sites containing undesirable web information, and automatically refers to the contents of web sites being provided to the Internet to extract any web site containing undesirable web information. The manual search system 12b serves to allow an individual to locate any web site containing undesirable web information. The block list system 13 includes a database 13a for storing a list of undesirable web sites to be blocked, collecting raw data and constructing a database by grading the collected data according to URLs to be blocked, a classification system 13b for determining whether an associated site is an undesirable web site on the basis of the list of undesirable web sites supplied from the search system 12, and a management system 13c for performing management operations on the recorded list such as category definition, site rating, keyword management, deletion of invalid sites, etc.

The web-robot in the automatic search system 12a extracts information of documents on the Internet based on Hypertext Transfer Protocol (HTTP), checks redundancy of the extracted information such that it does not extract information on a specific single site. The expert engine in the automatic search system 12a extracts undesirable web information including text, images, motion pictures, chatting contents, news groups and FTP downloads, and extracts list information of Internet sites including the undesirable web information.

The manual search system 12b serves to search our undesirable web sites which cannot be searched out by the automatic search system 12a. The manual search system 12b operates through a search engine operated by an Internet information search expert.

The undesirable web site information output from the automatic search system 12a or manual search system 12b is input to the block list system 13. The classification system 13b in the block list system 13 determines whether a web site is an undesirable web site or not on the basis of the undesirable web site information from the search system 12 using thresholds defined for each category. The undesirable web site list determined by the classification system 13b in the above manner is stored in the database system 13a. The database system 13a collects primitive data through a search operation of a list of URLs to be blocked, grades the URLs to be blocked and in turn constructs a database. The management system 13c manages the list of the undesirable web sites stored in the database system 13a by altering categories, sites, ratings, keywords, etc., and deleting invalid sites. The management system 13c performs operations to add, correct or delete categories, correct or delete sites determined to be undesirable web sites by the classification system 13b, and register new sites. Additionally, it can search for and delete any undesirable web site among the already constructed lists. It also includes review process which determines whether an associated URL is one of the undesirable web sites to be blocked according to a request from a subscriber. In this way, the link block system for an undesirable web site according to the invention can automatically perform operation to efficiently search for an undesirable web site and periodically update the undesirable web site lists.

Figure 3:
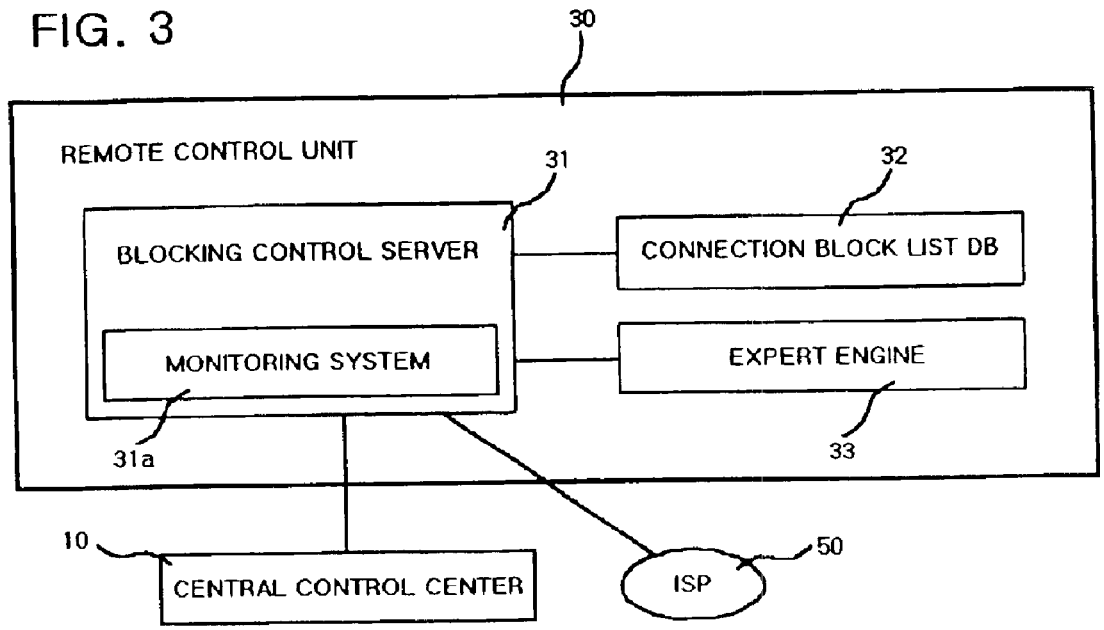
FIG. 3 is a block diagram of a remote control unit in the apparatus shown in FIG. 1.

FIG. 3 is a block diagram of a remote control unit 20 in the apparatus shown in FIG. 1, which receives the lists of undesirable web sites from the central control center 10 and blocks access to sites contained in the associated lists by the subscribers. The remote control unit 30 includes a blocking control server 31, coupled to the central control center 10, for specifying a block list and controlling access to the Internet by the subscribers, a connection block list DB 32 for storing the list of undesirable web sites received from the central control center 10 and an expert engine 33 for analyzing an information utilization pattern of the subscribers and transmitting information to the central control center 10 when the information is to be blocked.

The blocking control server 31 including a monitoring system 31a specifies the connection block list DB 32 and controls access to the Internet by the subscribers having registered for the undesirable web site blocking service for blocking access to undesirable web sites, based on the list. That is, the blocking control server 31 determines whether access to an associated ISP 50 is allowed, and provides access to the ISP 50 if the web site is not included in the list of undesirable web sites to be blocked. The expert engine 33 inspects information of the sites to which the subscribers attempt to access and send a notice to the central control center 10 when it determines that the information to be blocked.

Figure 4:
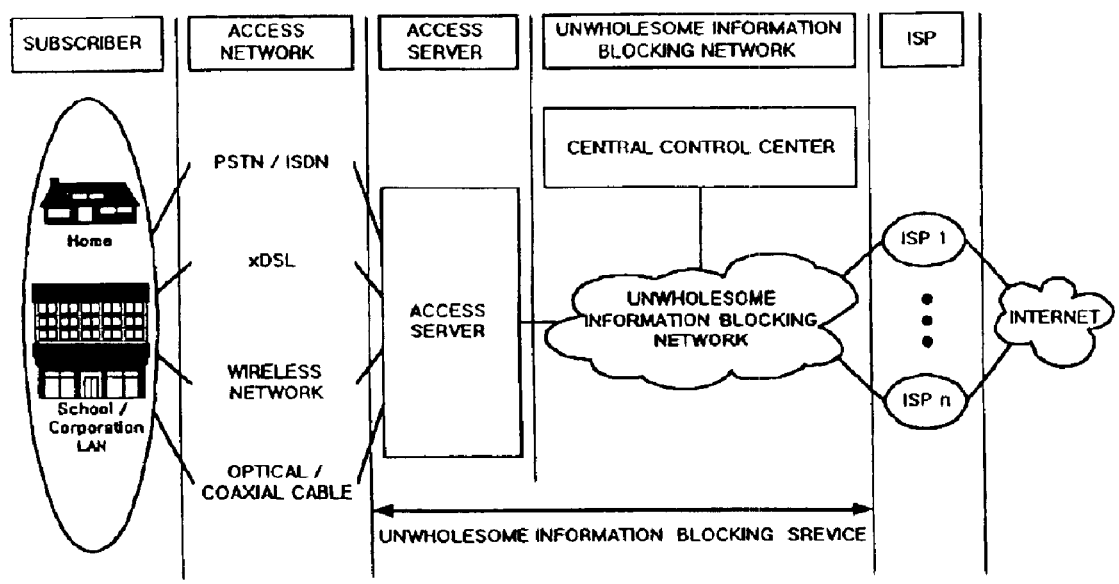
FIG. 4 is a schematic diagram showing an example for the construction of an undesirable web information blocking network using the apparatus of the present invention.

The undesirable web information blocking network shown in FIG. 4 can be constructed by applying the apparatus for blocking access to undesirable web sites, constituted as described above.

According to the undesirable web information blocking network shown in FIG. 4, the subscribers including personal computers at homes or LANs typically constructed in schools or corporations are connected to an access server through PSTN/ISDN, xDSL, wireless networks or optical/coaxial cables. The access server is an turn connected to the Internet Service Provider (ISP) who provides an Internet connection service through the undesirable web information blocking network, i.e., link control network 20 including the remote control unit 30 of the link blocking apparatus according to the present invention.

Therefore, among the subscriber requests to connect to predetermined web sites, the requests for connecting to sites contained in the undesirable web site list provided from the central control center 10 are blocked, and the requests for connecting to web sites not contained in the undesirable web site list are transmitted to the Internet Service Provider (ISP) according to undesirable web site information from the central control center 10, thereby allowing the subscribers to access associated sites.

Figure 5:
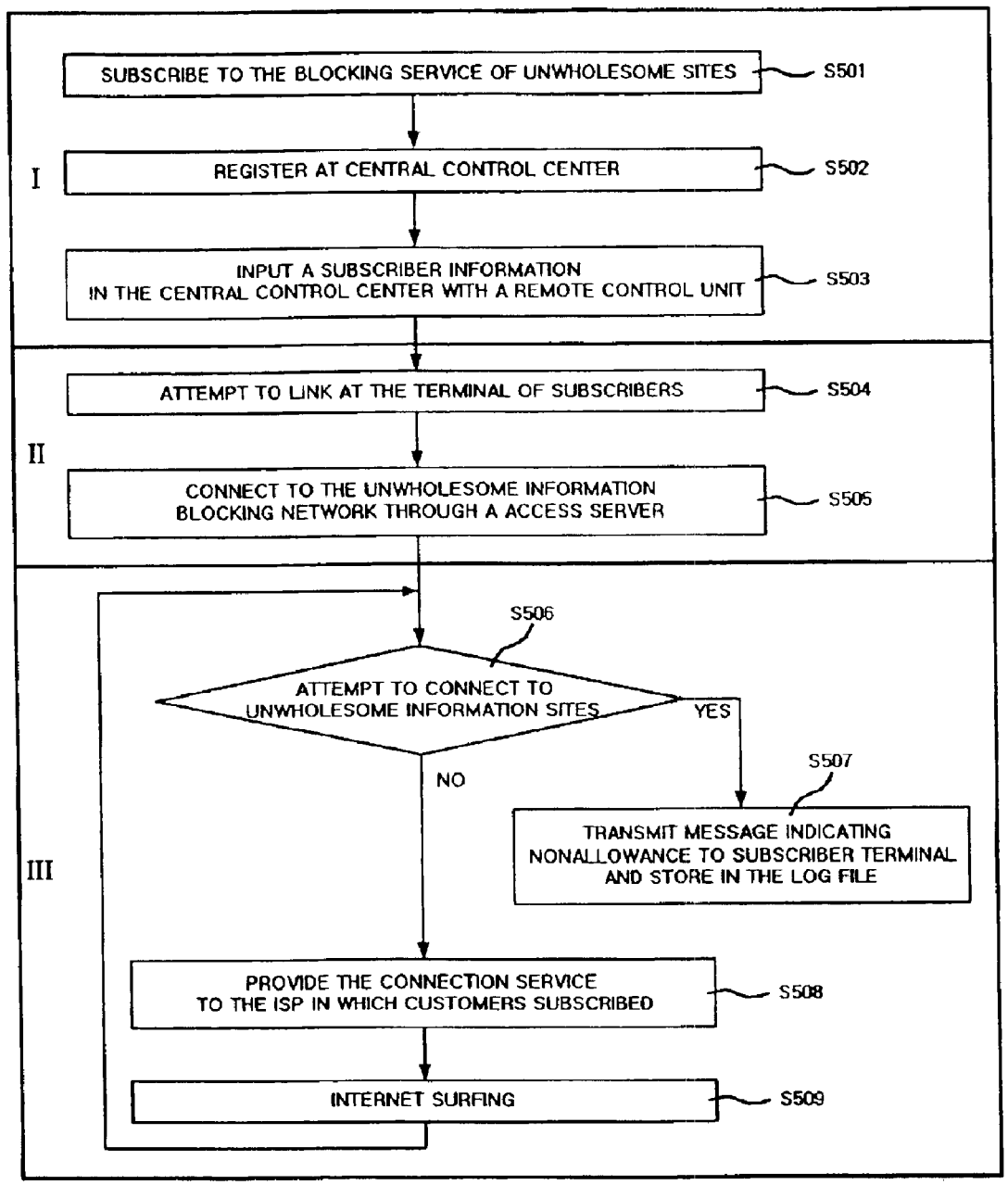
FIG. 5 is a flow chart for showing a method for providing undesirable web site blocking service for blocking undesirable web sites according to the present invention; and, FIG. 6 is a flow chart showing a construction process for building a list of undesirable web sites.

FIG. 5 is a flow chart showing a method for providing undesirable web site service for undesirable web sites using the link block apparatus for blocking access to undesirable web sites according to the present invention.

As shown in FIG. 5, when an individual or an organization such as a school and a corporation subscribes to the undesirable web site blocking service provided by the above described apparatus (step S501), information of the individual subscriber is registered in the central control center 10 (step S502), and the central control center 10 provides the information of the registered subscriber to the remote control unit 30 (step S503).

After finishing subscriber registration through the above steps S501 to S503, when the subscriber attempts to access the Internet through a terminal (step S504), the terminal accesses the undesirable web information blocking network including the remote control unit 30 and the link control network 20 through the access server as shown in FIG. 4 (step S505).

When an individual attempts access in this fashion, the remote control unit 30 determines whether the individual has registered for the undesirable web information blocking service, compares undesirable web sites in the undesirable web site list specified by the central control center 10 with the individual's destination URL, and determines whether the subscriber attempts to connect to an undesirable web site (step S506).

If the destination URL is in the list of undesirable web sites, it is determined that the subscriber is attempting to connect to the undesirable web site. Then, the remote control unit 30 transmits a message indicating non-allowance to the subscriber and stores it in a log file (step S507).

In contrast, if the destination URL is not in the list of undesirable web sites, the remote control unit 30 transmits connection information to the Internet Service Provider (ISP) 50 such that the subscriber can perform the desired Internet connection (step S508). After the connection, the subscriber can browse associated web sites (step S509).

The above steps S506 to S509 are repeatedly performed whenever the subscriber changes URLs, thereby preventing a subscriber from accessing undesirable web sites.

In the above description, it is necessary to specify the lists of the undesirable web sites to provide more reliable blocking of connection to the undesirable web sites.

Figure 6:
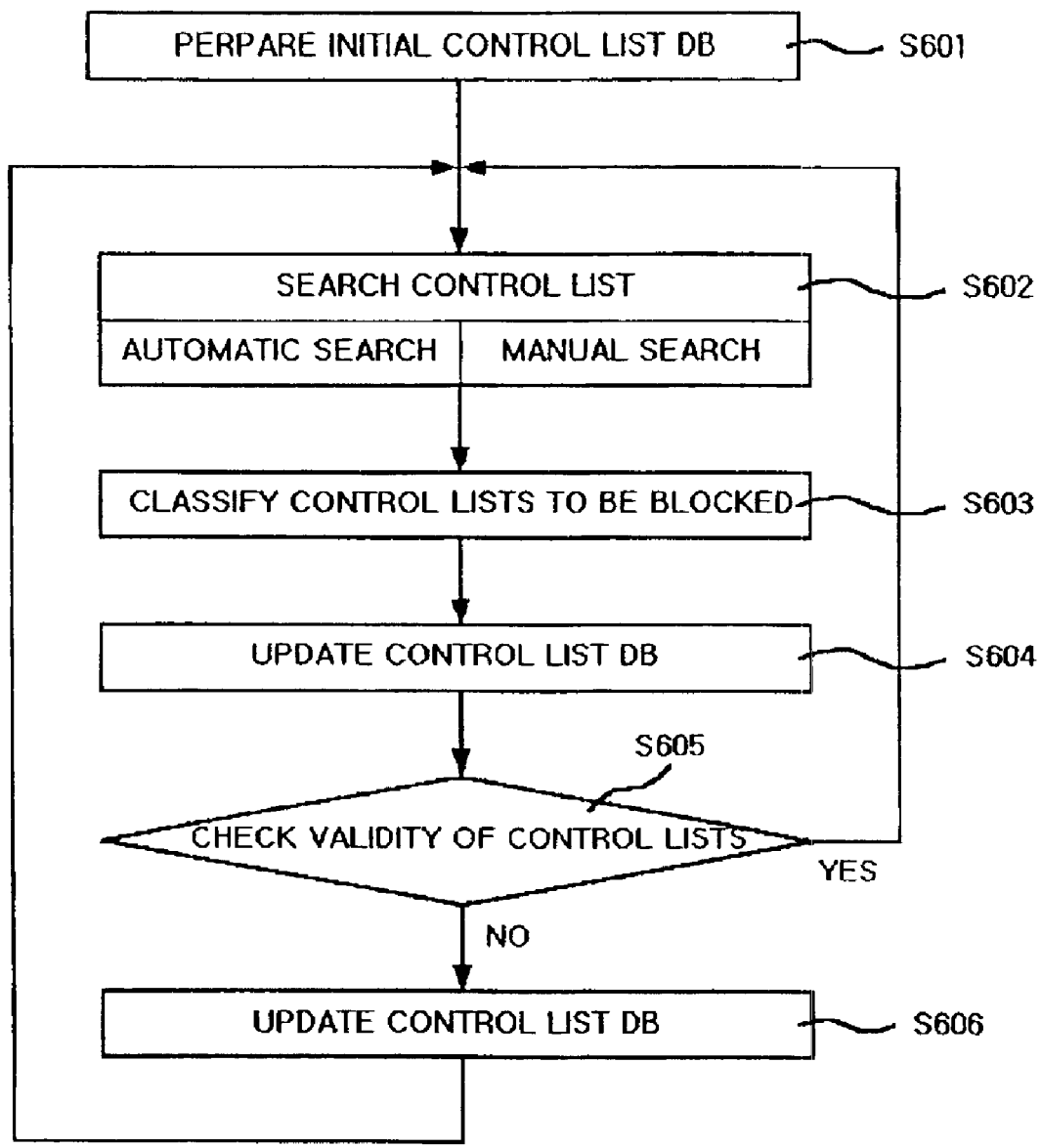

FIG. 6 shows a flow chart showing a construction process for a list of undesirable web sites, in which the process of specifying the list of the undesirable web sites is performed in the link block apparatus for blocking access to undesirable web sites on the Internet according to the present invention.

According to the flow chart in FIG. 6, the central control center 10 includes an initial control list DB (step S601). The central control center 10 checks whether the control list contains undesirable web information by means of automatic search by the automatic search system 12a or manual search by the manual search system 12b (step S602). The central control center 10 in turn classifies the control list into undesirable web sites and proper sites, and further classifies it by rating undesirable web sites based on the search results. Additionally, it updates the control list DB by changing the control list into a new list reflecting the search results and classified results, and repeatedly performs the process of updating the control list DB by checking validity of the control list (step S605) and deleting invalid sites. In this way, the control list of web sites to be blocked is specified.

The above described apparatus and method of blocking connection to undesirable web sites on the Internet provide the undesirable web site blocking service for blocking connection to undesirable web sites by central control as an additional service of the network, thereby blocking access to undesirable web sites by young people at home or in school and allowing the utilization of the Internet as a storehouse of healthy knowledge for education. The present invention also makes it possible to manage employees by restricting use of the Internet for unnecessary activities in the office, such as dealing with bonds and securities.

As described above, the apparatus and method according to the present invention can efficiently block access to an undesirable web site without the necessity of controlling the Internet connection individually at home, school or office, thereby reducing waste of time and costs for controlling the Internet connection. Also, since access to an undesirable web site can be blocked by the central control, the apparatus and method according to the present invention enable parents and managers to permit use of the Internet to children and employees without anxiety. Also, the apparatus and method according to the present invention have advantages in that the Internet can be utilized for more healthy and educational purposes.

What is claimed is:

1. An apparatus for blocking access to undesirable web sites comprising:

a central control center for specifying and providing control lists of the undesirable web sites to be blocked and for managing subscribers;

a plurality of remote control units disposed between Internet Service Providers (ISPs) and the subscribers for blocking access to the undesirable web sites based on the control lists to be blocked supplied from the central control center when the subscribers attempts to access the undesirable web sites; and a link control network for controlling connections of the plurality of remote control units and the central control center;

wherein the remote control unit includes:

a blocking control server, coupled to the central control center, for specifying a block list and controlling Internet connection by subscribers;

an access block list DB for storing the lists of undesirable web sites received from the central control center; and an expert engine for analyzing a type of utilizing information by the subscribers and for transmitting the information to the central control center when the information is to be blocked.

2. The apparatus according to claim 1, wherein the central control center comprises:

a central control system for searching and recording the undesirable web sites to be blocked in real time and for supplying the lists of recorded undesirable web sites to the remote control units;

a search system for searching out undesirable web sites; and a block list system for classifying, recording, sustaining, managing, or changing the lists of the undesirable web sites searched out by the search system.

3. The apparatus according to claim 2, wherein the search system comprises:

an automatic search system, including a web-robot for extracting all information of documents supplied on the Internet and an expert engine for checking contents of the information extracted by the web-robot and extracting list information of the sites containing undesirable information, for automatically referring to the contents of sites registered on the Internet and for extracting any sites containing undesirable information; and a manual search system for searching any sites containing undesirable information by an expert.

4. The apparatus according to claim 3, wherein the web-robot extracts all information of documents located on the Internet, browses redundancy of incoming information and avoids the users from devoting one site for an excessively long time.

5. The apparatus according to claim 2, wherein the block list system comprises:

a database system for storing lists of undesirable web sites to be blocked, collecting initial data and constructing a database by grading the collected data according to URL to be blocked, a classification system for determining whether an associated site is an undesirable web site on the basis of site information supplied from the search system; and a management system for managing the lists of the recorded undesirable web sites such as categories, ratings, keywords and invalid sites.

6. A method of blocking access to undesirable web sites when a subscriber attempts to access to undesirable web sites, comprising:

when an Internet user subscribes to a link block service, registering information regarding the user and providing the information to a remote control unit;

when the registered subscriber attempts to access a certain web site through the Internet, comparing the web site with lists of the undesirable web sites constituted by the central control center and destination URLs, and determining whether the subscriber attempts to access the undesirable web sites;

when a URL corresponding to the web site accessed by the subscriber is contained in the lists of the undesirable web sites, determining that the subscriber attempts to access the undesirable web sites, and transmitting a message indicative of disallowance site to the subscriber terminal; and when the URL corresponding to the web site accessed by the subscriber is not contained in the lists of the undesirable web sites, providing a message of allowance to an Internet Service Provider to which the subscriber is registered, and establishing a link between the Internet Service Provider and the subscriber terminal, wherein the comparing step to the providing step are repeatedly performed whenever the subscriber attempts to access a web site on the Internet;

wherein the constitution of the lists of the undesirable web sites in the central control center includes:

preparing an initial control list DB including text, picture, motion pictures, chat content, newsgroups and FTP servers information;

browsing whether the control list contains undesirable information and classifying the control list;

updating the control list DB by changing the control list into converted data based on the browsed results and the classified results;

checking the validity of each site in the control list through a web-robot, an expert engine and an Internet browsing expert; and updating the control list DB by deleting invalid sites, wherein the control list is specified by repeating the investigating step to the updating step after preparing the initial control list.

* * * * *